United States Patent

[11] 3,624,521

[72] Inventor Alfred J. Dellicicchi
West Newton, Mass.
[21] Appl. No. 47,696
[22] Filed June 19, 1970
[45] Patented Nov. 30, 1971
[73] Assignee Honeywell Inc.
Minneapolis, Minn.

[54] SYNCHRONOUS READ CLOCK APPARATUS
22 Claims, 3 Drawing Figs.

[52] U.S. Cl. .......... 328/119, 328/63, 328/113, 328/155, 331/17, 331/36, 340/174.1
[51] Int. Cl. .......... H03k 13/00
[50] Field of Search .......... 328/63, 113, 119, 155; 331/17, 18, 36; 340/174.1

[56] References Cited

UNITED STATES PATENTS

| | | | |
|---|---|---|---|
| 3,328,719 | 6/1967 | De Lisle et al. | 331/17 |
| 3,488,605 | 1/1970 | Schwartz | 331/17 |
| 3,510,786 | 5/1970 | Paulson | 328/155 |
| 3,518,554 | 6/1970 | Gabor | 328/63 |

*Primary Examiner*—Donald D. Forrer
*Assistant Examiner*—R. C. Woodbridge
*Attorneys*—Fred Jacob and Leo Stanger

ABSTRACT: A self-synchronizing read apparatus receives an encoded information pulse stream consisting of data and clock pulses from a random access device and applies this train across a normally inactive resonant tank circuit. The tank circuit generates a first reference signal and a detection circuit derives a reference clock waveform from predetermined reference points of the reference signal. The read apparatus further includes a generator circuit which generates a second linear reference signal from each of the pulses of the pulse stream and derives pulses of a data output waveform by applying the linear signals to a variable threshold switching circuit. The apparatus further includes circuits for generating an error voltage whose magnitude is proportional to the discrepancy in phase between the data train and reference signal and applies a correction voltage to the tank circuit which adjusts its frequency at a critically damped rate to decrease the discrepancy in phase.

INVENTOR
ALFRED J. DELLICICCHI
BY
Faith F. Driscoll
ATTORNEY

INVENTOR
ALFRED J. DELLICICCHI
BY Faith F. Driscoll
ATTORNEY

INVENTOR
ALFRED J. DELLICICCHI
BY Faith F. Driscoll
ATTORNEY

SYNCHRONOUS READ CLOCK APPARATUS

RELATED APPLICATIONS

"Synchronous Read Clock Apparatus" invented by Michael A. Koulopoulos filed Jan. 26, 1969, Ser. No. 794,576 and assigned to the same assignee named herein.

BACKGROUND OF THE INVENTION

1. Field of the Invention

This invention relates to read apparatus for use in decoding digital information read from a memory device. More specifically, the invention provides an improved synchronous read clock apparatus for facilitating the recovering of information encoded in a self-clocking data waveform.

2. Description of the Prior Art

Numerous techniques have been developed for processing data waveforms derived from a magnetic recording medium. In order to provide for higher density recording, recording techniques which are self-clocking have been used. The term "self-clocking recording" is defined as a recording technique in which digital information is encoded with synchronizing pulses and these synchronizing pulses are used to decode the data upon its readout from the magnetic recording medium. Forms of these recording techniques include phase encoding and double frequency recording.

In high-density recording systems using these techniques, the recorded data bits are severely shifted due to the effects of magnetic crowding and shift in data pulses as a consequence of effects caused by inaccuracies in the read/write circuit components, transducer tolerances, etc. For further discussion of these effects, reference may be made to an article titled "Computer Simulation of Waveform Distortions in Digital Magnetic Recordings" by W. W. Chu, IEEE Transactions on Electronic Computers, Volume EC-15, No. 3, June 1966, page 328ff.

With these self-clocking techniques, as for example, double frequency recording, there arises a need to maintain a maximum separation, i.e., one-half the bit interval, between sync pulses and data pulses notwithstanding severe shifting of these pulses from their normal positions in time.

Some circuits maintain separation of data pulses and clock pulses in phase-encoding recording systems by providing a constant reference signal derived from a free-running oscillator synchronized at the same frequency as the signal waveform representing data. A disadvantage of this circuit arrangement is that the oscillator can drift in frequency when operated over long periods of time. Accordingly, the time to synchronize the oscillator with a reference frequency becomes unpredictable and exceedingly long. Consequently, in magnetic recording systems where a read clock is synchronized by a number of synchronization pulses recorded prior to each data record, a larger number of synchronization pulses would have to proceed the data record in order to provide for frequency drift conditions. Furthermore, it is difficult to insure that the synchronization process for each data record starts at the same point in time.

Other schemes have utilized separate circuits for adjusting the frequency and phase of the reference signal of a read clock. Aside from the problem of maintaining a stable frequency, these read clocks normally generate output pulses without regard to whether the input data stream is present. Hence, the presence of timing output pulses in the absence of the input data stream can cause the decoding equipment associated therewith to produce logical signals indicating the presence of binary ZERO data.

Schemes proposed for use in decoding information using double frequency recording technique have used a fixed time period for sampling the presence of significant transitions within the data stream. Here, long term frequency variations are corrected by means of a number of integrated circuits connected in series, each having different time constants for establishing minimum and maximum frequency variations. These arrangements have been found difficult to adjust, and not readily adaptable for facilitating recovery of data from a recording medium such as a magnetic disk which is characterized by plural tracks located at different radial positions, each having a number of minimum and maximum variations. Furthermore, when the number of integrated circuits are reduced and combined with delay lines to establish minimum and maximum variations, these circuit schemes have not been found satisfactory in accommodating large shifts of data and sync pulses within the data stream.

The aforementioned patent application of Michael Koulopoulos has overcome a number of the above-mentioned disadvantages by utilizing apparatus which includes a "normally inactive" oscillatory circuit. That is, the apparatus includes a circuit which is externally excited by pulses of the input data stream received from the memory system. Additionally, this apparatus includes a few adjustment controls for establishing a predetermined relationship between the pulses of the input data stream to the clock train derived from the sinusoidal reference waveform produced by the oscillatory circuit. However, in some instances, i.e., for large amounts of bit shifting, difficulty has been experienced in easily adjusting the output clock train to be 180° out-of-phase with the input data stream pulses and still compensate for internal circuit delays. Such 180°-phase relationship is desirable so successive clock pulses can bracket individual data pulses for decoding them. Furthermore, changes in the number of input pulses which produce changes in the amplitude of the reference waveform could in some instances produce shifting in the pulses of the output clock train.

OBJECTS AND SUMMARY OF INVENTION

Accordingly, it is an object of this invention to provide improved clocking apparatus for self-clocking memory systems which is capable of accurate operation notwithstanding rapid and large timing disturbances to the pulses constituting the input data stream.

It is also an object of this invention to provide improved clocking apparatus that operates with high accuracy, and with increased ease of adjustment.

It is a further object of this invention to provide an improved "normally inactive" read apparatus for recovering information encoded in a self-clocked data waveform notwithstanding severe shifting in the phase of the pulses of the input data stream.

It is a specific object of this invention to provide an improved clock apparatus of the above character which automatically inhibits the generation of a timing output in the absence of a successive number of pulses read from a storage medium or when the phase of the pulses within the data stream departs from a reference value by more than a selected amount and an apparatus in which the reference signal can be automatically adjusted in both frequency and phase at a critically damped correction rate.

It is a more specific object of this invention to provide a read clock including a normally "inactive" tank circuit for producing a sinusoidal reference waveform having a predetermined relationship to the pulses of the input data stream wherein the pulses are shaped before being applied to the tank circuit so as to provide accurate, reliable read clock operation.

It is still a more specific object of this invention to provide a read clock of the above character which samples the difference in phase only during the presence of data pulses to provide improved sample and hold operation which is less subject to reference sinusoid distortions.

The above and other objects are provided according to the basic concept of this invention through a read clock apparatus including an oscillatory circuit which produces a sinusoidal reference waveform and is "normally inactive." That is, it operates only when externally excited by the encoded self-clocking data waveform constituting a data stream produced upon reading information from a magnetic memory system.

The read clock also includes circuits which sample the phase and adjust the frequency of the oscillatory circuit in proportion to the difference in phase between the reference waveform produced by the oscillatory circuit and the shaped pulses of the input data stream to maintain a predetermined phase relationship therebetween. Phase sampling occurs only at the time of the shaped data pulses which provides improved sample and hold operation between successive phase samplings.

The predetermined timing relationship mentioned is established through a generator circuit which generates a linear waveform which is used to derive pulses of the data stream waveform to have a predetermined relationship to clock pulses derived from the sinusoidal reference waveform. This arrangement facilitates the establishment of 180°-phase relationship between the pulses of the resultant data waveform and the pulses of the output clock waveform relative to the reference waveform.

In greater detail, the read clock apparatus includes circuits which generate clock output pulses from predetermined sets of crossover points of the sinusoidal reference waveform. At the same time, output pulses of the resultant data stream are derived by first generating a linear waveform from each of the pulses of the input data stream by feeding these data stream pulses through a ramp one-shot generator, the linear waveform is then fed to a variable threshold switching circuit. By adjusting the threshold of the switching circuit, the pulses of the resultant data stream can be easily made to have a predetermined phase relationship to the pulses of the output clock train generated from reference points of the sinusoidal waveform. Hence, a 180° out-of-phase relationship between the pulses of the resultant data stream waveform and output clock waveform is easily established initially with such adjustment being made without affecting the amplitude or other characteristics of the oscillatory circuit reference waveform.

One feature of the read clock is that it employs a sampling circuit which is only active during the presence of input pulses which allows storage of phase error signals for a predetermined period of time. Another feature of the read clock apparatus is that adjustments to the oscillatory circuit are made at a critically damped rate. An additional feature of the read clock is that it automatically stops producing timing pulses when predetermined number of pulses are missing in succession from the input data stream or when the pulses of the input data stream are phase shifted from the sinusoidal waveform by a predetermined amount.

A still further feature of the present invention is that the ramp one-shot generator and switching circuit include complementary transistor circuits arranged to reduce overall circuit complexity.

And, a still further feature of the present invention is that the read clock apparatus further includes a circuit which shapes the pulses of the input data stream in a Gaussianlike waveform for insuring accurate, reliable operation of the oscillatory tank circuit.

The above and other objects of this invention are achieved in an illustrative embodiment described hereinafter. Novel features which are believed to be characteristic of the invention, both as to its organization and method of operation, together with further objects and advantages thereof will be better understood from the following description considered in connection with the accompanying drawings. It is to be expressly understood, however, these drawings are for the purpose of illustration and description only and are not intended as a definition of the limits of the invention.

DESCRIPTION OF THE ILLUSTRATED EMBODIMENT

Figure 1:
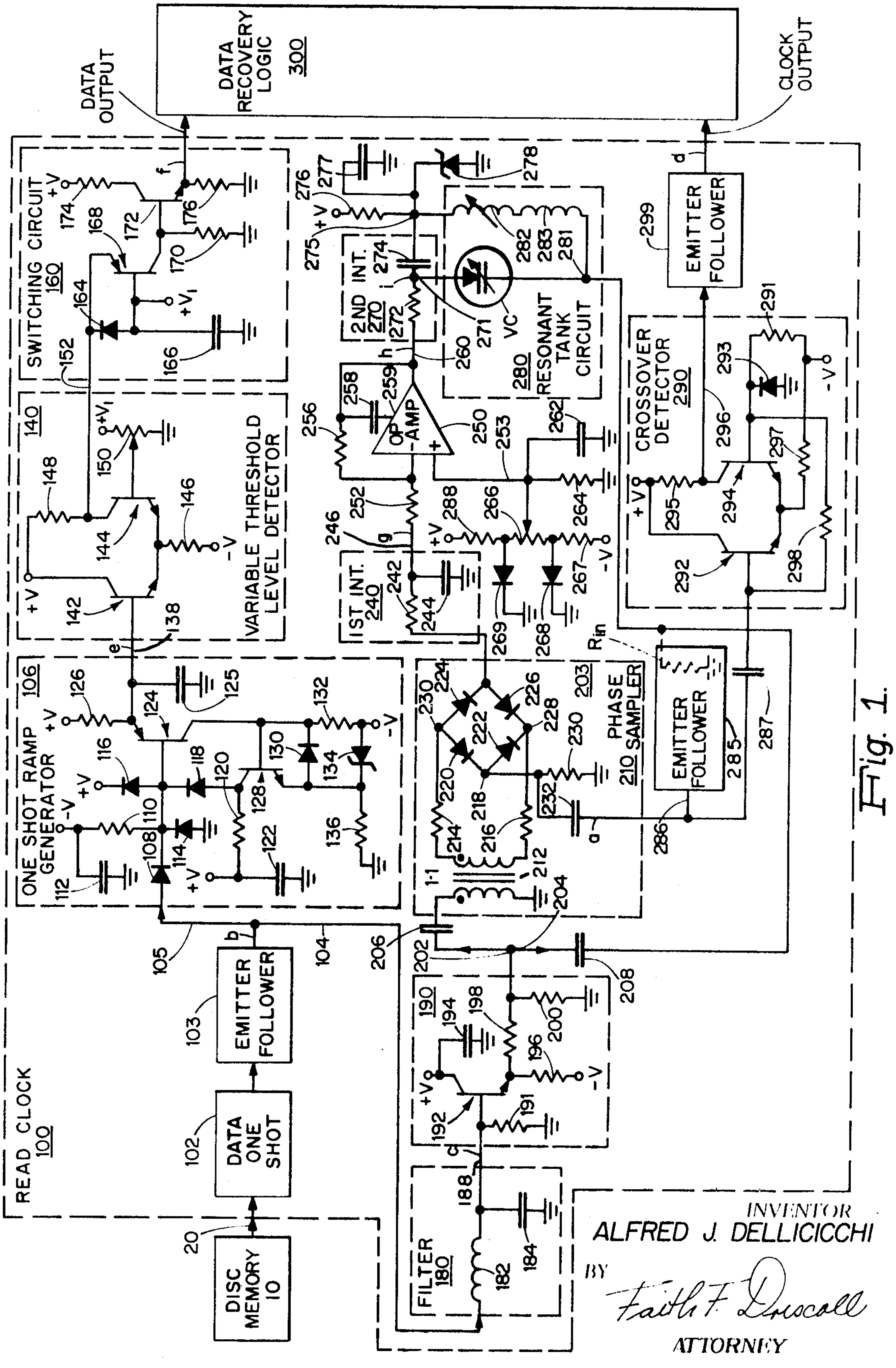
FIG. 1 is a simplified block in line diagram of a disc memory and portions of a control unit which includes a preferred embodiment of the read clocking apparatus of the present invention.

With reference to FIG. 1, the invention will be described in relation to a magnetic disc memory device 10 which as well known in the art includes a number of magnetic recording discs, an accessing mechanism with read/write circuits for either reading or writing information in any track located on the disc surfaces. It is assumed that the disc 10 records information with the double frequency recording technique mentioned above.

The device 10 as mentioned above includes conventional write/read circuits (not shown). The write circuit converts a digital signal into an analog signal for recording onto the disc surface and the read circuit converts the analog signal it senses, into a digital signal. The resultant digital signal produced by the read circuit when reading information from a track of the disc device 10, herein referred to as the data stream, is a digital self-clocking waveform which consists of clock pulses and data pulses. As illustrated in FIG. 1, the data stream waveform is applied via a data in line 20 to a read clock 100 and after processing to data recovery logic 300 included as part of the control logic for disc memory 10.

The data stream on line 20 is applied first to a one-shot circuit 102 in series with an emitter follower circuit 103. The one-shot circuit 102, conventional in design, triggers on the leading edge of each pulse of the data stream and produces uniform width output pulses which are independent of the input pulse width. The emitter follower circuit 103, also conventional in design, provides the requisite current driving capabilities at the frequency range of interest (e.g. 5 megahertz) by producing pulses having fast rise times.

The emitter follower circuit 103 feeds the pulses of the data stream to one-shot ramp generator circuit 106 along a line 105 and to a filter network 180 along a line 104.

The series of circuits which include the ramp generator 106, a variable threshold level detector 140, and a switching circuit 160, process the data stream pulses as described herein and provide a stream of data pulses as an input to the data recovery logic 300.

In greater detail, the one-shot ramp generator circuit 106 includes a pair of complementary transistors 124 and 128 connected respectively in a common collector and common emitter configuration as shown. Both transistors 124 and 128 are normally conductive. Specifically, in the absence of an input signal to line 105, a voltage source, −V, reverse biases a diode 108 and forward biases a diode 114 by applying a negative voltage to the diode 114 through an impedance 110. At this time, a source, +V, reverse biases a diode 116. Therefore, a negative voltage is applied to the base electrode of PNP-transistor 124 which renders transistor 124 conductive. By being conductive, the transistor 124 decreases the positive voltage level applied by voltage source, +V, through an impedance 126 and discharges a capacitor 125 connected to its emitter electrode to approximately zero volts.

The current flowing through the emitter-collector electrode path of transistor 124 is applied to the base electrode of NPN-transistor 128 and through a resistor 132 to the voltage source, −V. The voltage drop across resistor 132 decreases the level of negative voltage applied to the base electrode of transistor 128 which causes it to conduct. Current flows from positive voltage +V through collector resistor 120, the emitter-collector path of transistor 128 and through emitter resistor 136. This increases the positive voltage at the emitter electrode which otherwise is clamped at a value of negative voltage determined by a zener diode 134 connected as shown. A diode 130 connected across the base emitter junction of transistor 128 as shown, limits the amount of negative voltage applied to its base electrode.

Additionally, the collector electrode of transistor 128 connects through forward biased diodes 118 and 108 to input line 105. Capacitors 112 and 122 prevent noise from appearing at their respective supply voltage terminals. The output of the one-shot ramp generator 106 is applied along an input line 138 to the variable threshold level detector circuit 140.

The detector circuit 140 includes a pair of NPN-transistors 142 and 144 connected in common to a current source including an emitter resistance 146 and negative voltage, –V. The base electrode of normally conductive NPN-transistor 142 receives the output of generator 106 via input lead 138. The NPN-transistor 144, held nonconductive by transistor 142, has its base electrode connected to a voltage source, +V. This connection is made through variable impedance 150 which establishes the input voltage threshold level at which transistor 144 conducts. The collector electrodes of both transistors 142 and 144 connect to the supply voltage, +V, as shown. The detector 140 provides an output line 152 to the switching circuit 160 from the collector electrode of transistor 144.

The switching circuit 160 includes a pair of complementary transistors 168 and 172 connected respectively in a common base and common emitter configuration, as shown. Both PNP-transistor 168 and NPN-transistor 172 are normally nonconductive. Specifically, PNP-transistor 168 in the absence of an output voltage from detector 140 has its emitter/base junction reversed biased by a network including positive supply voltage, +V, and a diode 164 connected as shown. When nonconductive, the collector electrode of transistor 168 does not supply current to the base electrode of NPN-transistor 162 and an input resistor 170 connected between its base electrode and ground. By an absence of current to its base, transistor 162 remains nonconductive.

The NPN-transistor 172 has its collector electrode connected through a load resistor 174 to the positive supply voltage, $+V_1$, and its emitter electrode connected through emitter resistor 176 to ground. The transistor 172 of switching circuit 160 applies a voltage developed across emitter resistor 176 to the data recovery logic 300 along a line, DATA OUTPUT.

As mentioned previously, the output on line 104 is applied to a filter 180 including an inductor 182 and capacitor 184 which is in series with an emitter follower circuit 190. The LC filter 180 shapes the square wave pulses into a Gaussianlike waveform thereby eliminating harmonic ringing of the resonant tank circuit 280.

The emitter follower circuit 190 provides isolation between line 188 and the resonant tank circuit 280, and includes an NPN-transistor 192 which connects to a voltage divider network consisting of series impedances 198 and 200. The voltage divider network limits the amplitude of the voltage waveform to be applied as an output via line 202 to a junction 204. This reduces possibilities of distortion of the signal developed across resonant tank circuit 280.

The shaped pulses appearing on junction 204 are AC coupled as an input to portions of a loop 203. Specifically, these pulses are applied to phase sampler 210 and to resonant tank circuit 280. The loop 203 includes series connected phase sampler 210, first integrator 240, amplifier 250, second integrator 270, resonant tank circuit 280, and emitter follower 285.

In greater detail, the output at junction 204 is coupled through capacitors 206 and 280 respectively to the primary winding of transformer 212 of phase sampler 10 is a junction 281. The input received by transformer 212 is coupled through its secondary winding and a pair of impedances 214 and 216 across a branch network including diodes 220, 222, 224, and 226 connected as shown.

A capacitor 232 applies as a second input to phase sampler 210, a sinusoidal reference waveform developed by the shaped pulses being applied to from resonant tank circuit 280 to a junction 218 of the phase sampler 210. The reference waveform is generated by the pulses being applied via capacitor 208 which start the resonant tank circuit ringing and this waveform is maintained at a constant amplitude under a continued stream of pulses occurring within certain time intervals of each other. During normal operation of the tank circuits 280, the absence of pulses from the input data stream cause a decrease in the amplitude of the waveform which is detected in the manner described herein below.

The coupling capacitor 232 provides the tank circuit sinusoidal reference waveform to phase sampler 210 at all times. The phase sampler 210 is conditioned by the shaped pulse input applied by capacitor 206 to sample the phase difference between the shaped pulses and sinusoidal reference waveform. Specifically, the shaped pulses turn the bridge network on and current flows through a resistor 242 and into or out of a capacitor 244 of the integrator circuit 240 depending upon the phase relationship between the sinusoidal reference waveform and shaped pulse. The operation is described herein in greater detail.

The output of the integrator circuit 240 is applied to a line 246 which connects through an impedance 252 to a voltage amplifier 250, conventional in design. The voltage amplifier circuit 250 can take the form of circuits described in a publication by Fairchild Semiconductor Corp. titled "uA702 High Gain Wide Band DC Amplifier" dated Feb. 1966.

The amplifier 250 receives as a second input, a reference voltage V applied to a line 253. A variable impedance 266 can be adjusted to provide a predetermined voltage level from a voltage divider network including positive and negative supply voltages, +V and –V, clamping diode 269 and impedances 288, 267, and 264 connected as shown. The voltage level is selected to provide for circuit delays within the loop 203 so as to establish a predetermined phase relationship with the sinusoidal reference waveform and the shaped pulses.

The amplified voltage output of stage 250 is applied along a line 260 as an input to one element of a second integrator circuit 270. As shown, the second integrator circuit 270 includes a resistance 272 in series with a capacitor 274. The other end of capacitor 274 connects to a junction 275 in common with a capacitor 277, a resistance 276 and a zener diode 278. The voltage source +V supplies a *d-c* biasing voltage to the cathode of a varactor diode VC through resistance 276 and series inductors 282 and 283. The output line 271 of integrator 270 is applied to the anode of varactor diode VC of resonant tank circuit 280.

As shown, the resonant tank circuit 280 has two branches, a first includes the variable inductor 282 in series with fixed inductor 283, and a second branch includes varactor diode VC. The capacitor 277 couples any noise signals from supply source, +V.

The capacitance of the varactor VC and the inductance of inductors 282 and 283 determine the operative frequency of tank circuits 280.

As previously mentioned, the shaped pulses applied to junction 281 activate tank circuit 280 to produce the sinusoidal reference waveform at the operative frequency. The tank circuit 280 can be viewed as absorbing the shaped pulses as applied, so that only the reference sinusoid waveform appears at the high impedance input of emitter-follower circuit 285. Emitter-follower 285 applies the reference waveform to phase sampler 210 and to a crossover detector 290.

In greater detail, the sinusoidal waveform present at the output of the emitter-follower 285 is AC coupled through a capacitor 287 to crossover detector 290. As shown, the crossover detector circuit 290 includes a pair of NPN-transistors 292 and 294 having their emitter electrodes connected in common through an impedance 297 to a negative voltage source, –V. The base electrodes of transistors 292 and 294 are interconnected through a resistance 298. The voltage source, –V, applies a negative bias voltage through a resistance 291 in series with a clamping diode 293. The collector electrodes of transistors 292 and 294 respectively connect directly and indirectly to positive supply voltage, +V as shown. In the absence of a signal to the base electrode of transistor 292, transistor 294 conducts rendering transistor 292 nonconductive. The voltage drop across load resistor 295 decreases the voltage level applied to an output line 296 to a value of approximately zero volts.

The crossover detector 290 is biased by voltage, −V, to trigger only on positive going voltage transitions. When triggering occurs, transistor 292 conducts, switching off transistor 294. When this occurs, the collector voltage appearing on output line 296 increases from zero volts toward the positive source voltage, +V. Detector 290 applies this voltage change to an emitter-follower circuit 299 which in turn applies a clock output waveform via line CLOCK OUTPUT line as a second input to the data recovery logic 300.

RECOVERY LOGIC 300

Figure 3:
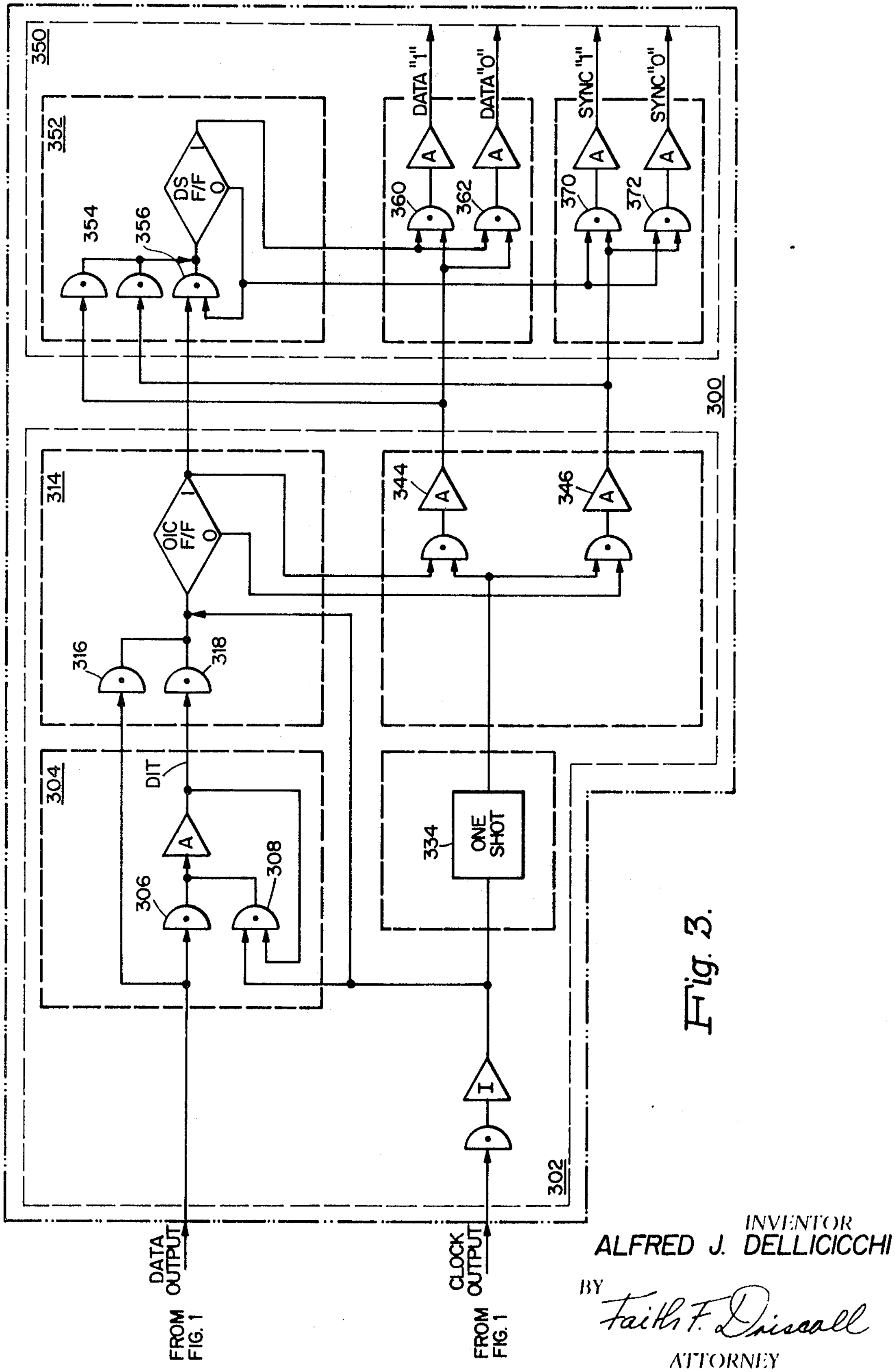

Referring now to FIG. 3, the recovery logic 300 will now be described briefly. The data recovery logic 300 responds to the pulses of the clock output and data output provided by the read clock 100 to generate control signals which define the intervals during which the data pulses of the input data stream are to be sampled for content (i.e., decoded into binary ONE's and ZERO's).

As shown, the data recovery logic 300 includes a data register logic 302 and a data separator logic 350. The data register logic 302 determines whether the data input stream contains binary ONE or binary ZERO information.

As shown, the data register logic 302 includes a latch logic circuit DIT labeled as block 304 which connects in series with a flip-flop, OIC. Flip-flop OIC and associated input gating logic circuitry are labeled as block 314. The data output and clock output lines from read clock 100 are applied individually to each of the blocks 302 and 314 as shown.

The binary ONE and binary ZERO outputs of flip-flop OIC are applied to a pair of amplifier gates 344 and 346. These amplifier gates also receive a signal line from a one-shot multivibrator circuit 344 which is triggered by pulses from the CLOCK OUTPUT line of read clock 100.

The data separator logic 350 separates the outputs from data register logic 302, into clock and data signals. The clock and data signals are applied on two sets of lines, DATA "1," DATA "0" and SYNC "1," SYNC "0" to auxiliary logic, not shown. As shown, separator logic 350 includes a flip-flop DS with associated input AND logic gates 354 and 356 labeled as block 352. Its binary ZERO and binary ONE outputs and outputs from gates 344 and 346 are interconnected to a pair of data amplifier gates 360 and 362 and a pair of clock amplifier gates 370 and 372.

DESCRIPTION OF OPERATION

The operation of FIGS. 1 and 3 will now be described with reference to the waveforms of FIG. 2. Waveform (*b*) of FIG. 2 shows a typical data stream of sync and data pulses labeled S and D, after processing by data one shot 102 and emitter-follower 104 to attain fixed pulse widths.

The sync pulses (S) of waveform (*b*) define the boundaries of a bit interval or cell. In the illustrated waveforms, they occur nominally at intervals of 400 nanoseconds. The data pulses (D) nominally occur at the midpoint of the bit intervals as shown. The variations in timing intervals shown in waveform (*b*) indicate assured variations in the frequency and phase of the pulses for the illustrated embodiment. Specifically, the values shown contemplate a frequency variation in either direction of 3 percent and a maximum phase variation of 25 percent within a period. The period here is defined as the time interval between the leading edge of a data pulse (D) and the leading edge of a sync pulse (S) which is nominally 200 nanoseconds.

Figure 2:
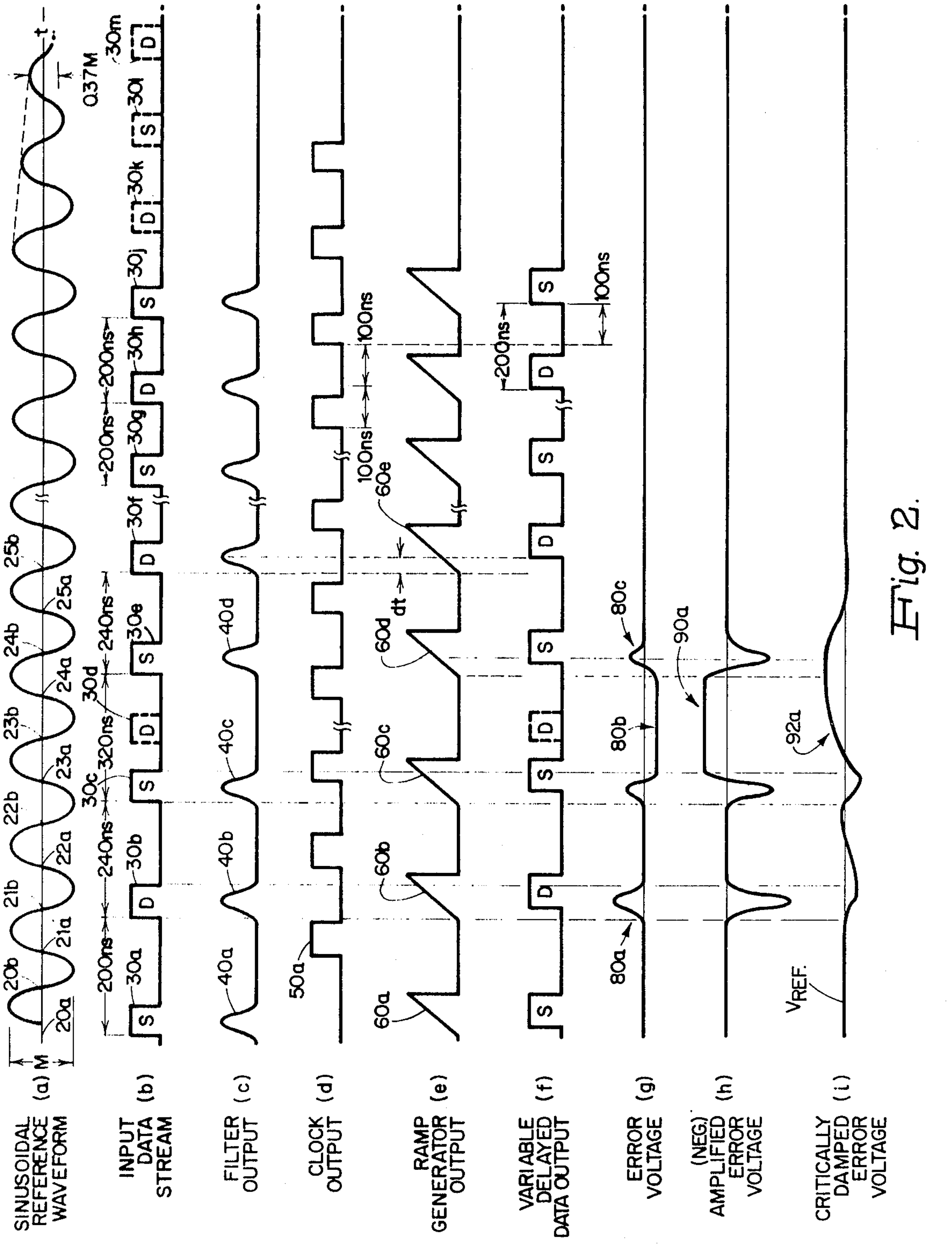
FIG. 2 is a set of timing diagrams used to explain the operation of the read clock apparatus of FIG. 1; and, FIG. 3 shows in block diagram form the recovery logic of FIG. 1 for deriving the information from the encoded self-clocking waveform from the data and clock outputs from the read clock.

As illustrated by FIG. 2, the maximum displacement which either a sync or data pulse undergoes is where a sync pulse follows a data pulse but is not in turn followed by a data pulse. This results in shifting the sync pulse toward the following sync pulse due to pulse crowding effects. The maximum interval, normally 200 nanoseconds, does not exceed 240 nanoseconds and the minimum interval, normally 400 nanoseconds, is not less than 320 nanoseconds.

Assuming that the resonant tank circuit 280 has been operating at its nominal frequency (e.g., 5 megahertz), it has been generating at its output 284, the sinusoidal reference signal corresponding to waveform (*a*) of FIG. 2 with an amplitude, M.

During the above operation, phase sampler 210 has been comparing the time occurrence of the Gaussian-shaped pulses at the filter output corresponding to waveform (*c*) relative to the zero crossover points of sinusoid waveform (*a*) for deriving a voltage proportional to the difference in phase therebetween. More specifically, the phase sampler 210 operates in the region of a zero crossing characteristic in particular, about the zero crossings of the sinusoidal waveform (*a*).

Further, and more importantly, phase sampler 210 only samples the reference sinusoid for a time period determined by the presence of a shaped pulse at its input transformer 212. Accordingly, when the shaped pulse brackets the zero crossover point symmetrically (i.e., are in exact phase quadrature), phase sampler 210 produces an output signal which has equal position and negative portions. It applies this signal to integrator 240 which it sums or averages out to zero volts. Slight shifts in the relative phases of the two signals change the balance between the positive and negative portions occurring during the presence of pulses of waveform (*c*) so that when they are summed by integrator 240, they provide a positive or negative DC voltage error signal whose magnitude is proportional to the phase difference between the two signals and whose polarity indicates the direction of shift. The time constant of the integrator 240 is selected so it integrates equal amounts in the positive and negative directions yielding zero volts when the two input waveforms are in proper phase.

Referring again to FIG. 2, the first two shaped pulses labeled **40*a* and 40*b*** of waveform (*c*) derived respectively from the first sync pulse (S) and data pulse (D) of waveform (*b*) evenly bracket the first positive going and second negative going zero crossing of waveform (*a*), labeled with the numerals **20*a* and 21*b*. In addition to supplying energy to the resonant tank 280, each of the pulses 40*a* and 40*b* cause phase sampler 210 to sample equal positive and negative portions of the sinusoid. Therefore, equal amounts of current flows into and from integrator capacitor 244 which causes the integrator 240 to produce a zero error voltage on line 246 corresponding to a portion 80*a*** of waveform (*g*) in FIG. 2.

The zero voltage level is applied to the inverter input (−) of amplifier 250 which in turn produces a zero error voltage as illustrated by waveform (*h*) in FIG. 2. This level is applied to integrator 270 via line 260. In integrates at a predetermined exponential rate any change in voltage thereby producing in the above, a zero error voltage as illustrated by waveform (*i*) which it applies to the anode of varactor diode VC from junction 271.

It will be noted that the waveform (*i*) is referenced with respect to a nominal value of reverse bias reference voltage. This reference voltage corresponds in magnitude to the difference between DC voltages at junctions 271 and 281 (i.e., bias voltage across diode, VC). Here, when there is no error, the source, +V, may be viewed as applying the only negative DC reference voltage to varactor diode, VC. While, at the same time, the capacitor 277 places the junction 270 at zero volts AC. Accordingly, the integrator 270 in response to no change in negative voltage maintains the same magnitude of negative bias voltage applied to the anode of varactor diode, VC as shown by waveform (*i*) as corresponding to the reference voltage (−V ref.).

The same negative voltage applied to varactor diode, VC, causes it to maintain its capacitance at the same value which in turn maintains the frequency of the resonant tank 280 at the same value.

The operation of phase sampler 210 and loop 203 is best understood when considering its response to sync pulses **30*c* and 30*e* and data pulse 30*f*** of waveform (*b*). Specifically, since the shaped pulse **40*c* derived from sync pulse 30*c* occurs later in time with respect to the zero crossover point 23*a*, phase sampler 210 samples a greater amount of the negative portion of the sinusoid. Thus, more current flows out of than into integrator capacitor 244 which causes the integrator 240 to produce a negative voltage on line 246 as illustrated by a portion 80***b* of waveform (*g*) in FIG. 2.

The amplifier 250 amplifies and inverts the negative voltage in turn applying a positive voltage corresponding to portion 90*a* of waveform (*h*) to integrator 270 via line 260. The integrator 270 integrates this voltage at a predetermined exponential rate in turn producing a positive voltage corresponding to portion 92*a* of waveform (*i*). When this positive voltage is applied to the anode of varactor diode, VC, it decreases the amount of reverse bias which in turn increases the diode's capacitance. Accordingly, this decreases the frequency of the resonant tank circuit 280 which shifts the next zero crossing labeled 33*b* to the right thereby compensating for the displacement of sync pulse 30*c* left of its nominal position.

Since the bridge network of phase sampler 210 turns off in the absence of a pulse to input transformer 213 capacitor 244 holds its negative voltage charge until the next shaped pulse 40*d* is applied to the sampler 210. As illustrated, this shaped pulse 40*d* derived from sync pulse 30*e* occurs earlier in time than the zero crossover point 24*a*. Therefore, phase sampler 210 samples a greater amount of the positive portion of the sinusoid of waveform (*a*). And, more current flows into than out of capacitor 244 which causes the integrator 240 to decrease its error voltage to approximately zero volts as illustrated by point 80*c* of waveform (*g*) in FIG. 2. Amplifier 250 now applies a zero volts level to integrator 270 which increases from the amount reverse bias across varactor diode, VC, thereby decreasing the diode's capacitance to its nominal value. Accordingly, the resonant tank circuit 280 frequency is increased to its original frequency which shifts the next zero crossing labeled to the left thereby compensating for the displacement of sync pulse 30*e* to the right of its nominal position.

Summarizing the foregoing operation, the error control loop 203 responds to the opposite shifts or displacements of the sync pulses (S) produced when these pulses bracket a "BINARY ZERO" data pulse by changing the frequency of the tank circuit 280 to shift the phase of the sinusoid, while providing a net error change and corresponding frequency change of zero during the cycle of operation resulting from the two sync pulses. Hence, as illustrated, phase sampler 210 is able to provide the correct value of error voltage corresponding to waveform (*g*) for the next pulse which, as waveform (*c*) illustrates, brackets symmetrically, the zero crossing 25*b*.

By noting the predictable behavior of sync pulses within the data stream corresponding to waveform (*c*), phase sampler 210 is operated so as to provide the appropriate sample and hold characteristics for developing the proper error voltage input to error loop 203. It will be noted that the 101 sequence of pulses in waveform (*b*) produces the minimum and maximum phase shifts as discussed above.

While the reference sinusoid waveform (*a*) is being applied to phase sampler 210, it is also applied through emitter-follower 285 and capacitor 287 to crossover detector 290. Since detector 290 is biased so to switch its state only on positive going zero crossover points of the waveform (*a*), it produces a pulse 50*a* of waveform (*d*) of FIG. 2 during the time period discussed above.

In greater detail, the positive going transition corresponding to zero crossover point, 21*a*, causes transistor 292 to conduct switching transistor 294 off. This allows the voltage at its collector electrode to rise toward, +V. The change in collector voltage is coupled to emitter-follower 299. The emitter-follower 299 conducts until it reaches saturation thereby producing the pulse 50*a* on the line CLOCK OUTPUT. When the voltage level of the sinusoid waveform decreases to a certain level, detector 290 in a well-known manner switches back to its original state wherein transistors 292 and 294 respectively are cut off and conducting.

It will be noted that while the data stream pulses of waveform (*b*) are being applied to filter 180, the same pulses are applied to one-shot ramp generator 106, a first of the circuits which process independently, the data stream pulses to provide the data output corresponding to waveform (*f*) of FIG. 2.

In greater detail, emitter-follower 103 feeds the positive sync and data pulses (S) and (D) of waveform (*b*) along line 105 trough forward biased diode 108 to the base electrode of conducting PNP-transistor 124. Each positive pulse reverse biases the base-emitter junction of transistor 124, switching it off. Capacitor 125 prevents the voltage level at the emitter electrode of transistor 124 from changing instantaneously. Therefore, capacitor 125 charges linearly toward a positive voltage level which will turn on transistor 124. The charging of capacitor 125 produces the ramp waveforms of waveform (*e*) in FIG. 2. Simultaneously therewith, transistor 124 by being nonconductive, increases the level of negative voltage applied to the base electrode of NPN-transistor 128 thereby causing it to be switched off. This in turn provides a current path through diodes 116 and 118 and resistor 120 which establishes a positive voltage level at base electrode of transistor 124. When the sync pulse (S) is no longer present, there is no change in the state of ramp generator 106. That is, capacitor 125 is still charging and continues to charge until its voltage level exceeds by a diode drop, the positive voltage level applied to the base electrode of transistor 124. When this happens, transistor 124 switches on and discharges capacitor 125 to zero volts. At the same time, the current flowing through the emitter-collector path of transistor 124 decreases the amount of negative voltage applied to the base electrode of transistor 128 thereby switching it on. Now the ramp generator 106 is again in the state it was prior to the receipt of the sync pulse (S).

When the generator 106 receives the data pulse (D) it operates in the same manner to generate the ramp output signal 60*b* of waveform (*e*) in FIG. 2. It will be noted that the time constant of resistor 126 and capacitor 125 is selected to be greater than the width of the input pulse but such as to produce a ramp output signal within every 200-nanosecond period.

Each of the positive ramp output signals are applied to variable threshold detector 140. Referring to FIG. 2, it can be seen from ramp output signal 60*e* that the time at which the switching circuit 160 generates pulses corresponding to waveform (*f*) of FIG. 2 can be varied. As mentioned previously, by adjusting the threshold voltage applied to the base electrode of transistor 144, the length of time until detector 140 switches on can be increased or decreased. This is illustrated in FIG. 2 by the time interval labeled *dt* in waveform (*e*).

When detector 140 switches on, it applies the negative going change in voltage across the base-emitter junction of PNP-transistor 168, switching it on. Transistor 168 when conductive passes current through its emitter-collector path into the base electrode of NPN-transistor 172, switching it on. At this time, transistor 172 produces a sharp rise time data output pulse corresponding to waveform (*f*) of FIG. 2.

OPERATION OF DATA RECOVERY LOGIC 300

Referring to FIGS. 2 and 3, the logic 300 in response to the stream of pulses corresponding to waveforms (*b*) and (*d*) applied by read clock 100 to lines DATA OUTPUT and CLOCK OUTPUT, separates the data pulses (D) from the input data stream.

In greater detail, the data register logic 302 separates the waveform (*b*) into two streams, one containing "ZEROS" and the other containing "ONES."

Flip-flop DIT serves as the sensor of data during a cell interval. It is set to a binary ONE and latches up via AND recirculation gate 308 whenever a data pulse appears in the information cell. Sync pulses (S) reset flip-flop DIT via AND-gate 318.

The sync pulses set or reset (i.e., toggle) flip-flop OIC in accordance with the state of flip-flop DIT and therefore it stores the state of the information sampled in the previous cell interval.

The one shot 334 triggers on the trailing edge of each sync pulse received on line CLOCK OUTPUT. Therefore, either of the logic gates 344 and 346 will generate a binary ONE output for the duration of the one-shot output depending upon the state of flip-flop OIC. That is, gate 344 produces a binary ONE if flip-flop OIC is set to a ONE. ALternatively, gate 346 produces a binary ONE if flip-flop OIC is set to a binary ZERO.

The separator logic 350 separates the sync and data bit outputs by comparing the state of the data sync flip-flop DS with the bit outputs provided by gates 344 and 346.

Specifically, during normal operation, a pulse will be present on the DATA OUTPUT line at least every other information cell interval (i.e., a sync pulse). The flip-flop DS is set each time a sync pulse is sensed. During alternate cell intervals, flip-flop DS is reset when the data input contains a data pulse. Gates 354 condition flip-flop DS to switch state on the trailing edge of a binary ONE being applied from either gate 344 or gate 346. Therefore, it will be in its reset state when the data input is a sync pulse and in its set state when the data input is a data pulse.

The binary ONE and ZERO outputs of flip-flop DS in turn condition certain ones of the gates 360, 362, and 370, 372 for the duration of the one shot output. In particular, an output will be applied to the DATA "1" output when a data pulse was detected and similarly, an output will be applied to the DATA "0" output in the absence of a data pulse (i.e., DATA ZERO).

The same is true for the SYNC "1" output and SYNC "0" outputs. That is, an output will be applied to the SYNC "1" when a sync pulse is detected and an output will be applied to the sync "0" line in the absence of a sync pulse.

It will be noted that the read clock 100 maintains maximum separation between the data pulses of the input data stream and the pulses of the clock output, notwithstanding frequency and phase changes of pulses within the data stream.

Since the resonant tank circuit 280 derives all if its energy from the shaped pulses of waveform (*c*) of FIG. 2, the absence of successive pulses (i.e., those labeled 30*k*, 30*l*, and 30*m*) within the data stream causes a decrease in the amplitude (M) of the sinusoid reference signal. Specifically, as illustrated in FIG. 2, the amplitude (M) of the sinusoid signal waveform a decreases to 37 percent of its original value when three successive pulses are absent from the input data stream. As a consequence of the decrease in amplitude, crossover detector 290 will not switch at this amplitude and hence fails to produce further timing pulses as illustrated by waveform *d* of FIG. 2.

The number of pulses can be selected by choosing an appropriate value for Q of the resonant tank circuit 280. In the illustrated embodiment, this selection is made so that the dampening factor is less than unity in order for the tank to have an oscillatory response. Additionally, the Q of the resonant tank circuit is such that the circuit oscillates for three cycles before its amplitude decreases to $1/e$ of its original value. By selecting a value for Q, then calculating the dampening factor, specific values for R eq., L eq. and C eq. of the resonant tank circuit can be calculated. For further details as to how this exact calculation is made reference may be made to the aforementioned patent application of Michael A. Koulopoulos.

It will be noted that the resistance R eq. corresponds to the input impedance, Rin of emitter-follower 285. For a value of Q, R eq. in the illustrated embodiment has a value of 10 kilohms, L eq. and C eq. respectively have values of 13.2 microhenries and 77 picofarads. The total inductance L eq. corresponds to the inductance of inductors 282 and 283, while the capacitance C eq. corresponds to the capacitance of varactor diode, VC. For all practical purposes the other values of capacitance which are large in comparison with capacitance of the varactor diode may be disregarded.

As mentioned earlier, the frequency and phase of the sinusoid reference signal are corrected at a predetermined exponential rate in accordance with the error signal produced by phase sampler 210. This correction rate is a critical damped rate. Here the period of the sinusoid is corrected by a percentage alpha ($\alpha$) of the error voltage generated as a result of phase sampling. Similarly, the phase difference is corrected by percentage beta ($\beta$) in accordance with the same error voltage. The evaluation of these percentages is based upon reaching a zero error state within a specified number of pulses. In the illustrated embodiment, the values of 0.012 for $\alpha$ and 0.20 for $\beta$ were found to provide satisfactory results.

It may be shown that since the error in the environment under consideration varies as an exponential exhibiting critically damped behavior, the error function in equation form corresponds to the expression:

$$e_r(K_n)=(C1+K_nC2)e^{-\gamma K_n} \qquad (1)$$

where $C1$ is a coefficient for phase, $C2$ is a coefficient for frequency, and $\gamma$ is related to $\alpha$ as follows:

$$\gamma=\ln(1-\sqrt{\alpha}) \qquad (2).$$

Further the term $e_r(K_n)$ defines the error at some pulse $K_n$ while the coefficients $C1$ and $C2$ respectively define the phase and frequency error which becomes zero after $K_n$ number of pulses.

The coefficient $C1$ is evaluated under initial conditions (i.e., where $n=0$ and the error $e_r(K_n)=0.5$. The coefficient $C2$ is evaluated where the error decreases to zero with predetermined number of pulses. In the illustrated embodiment this number is selected to be 15.

Substituting the aforementioned values, the expression for $e_r(K_{nn})$ now becomes:

$$(-0.5+K_n0.033)e^{-\gamma K}n.$$

Different values of $\gamma$ may be calculated by substituting values for $\alpha$ into equation 2.

By utilizing the value $\gamma$ in selecting the time constant for the loop 203, the desired critically damped rate of correction is attained. Specifically, the correction voltage of the loop 203 of FIG. 1 takes the form of the expression:

$$e_c=K\cdot(1-e^{-t/RC}) \qquad (3).$$

It will be noted that in loop 203, the exponent $t/RC$ corresponds to the product of the time constants of integrators 240 and 270. That is, if the integrator 240 is assumed to have a time constant equal to $T1$ and the integrator 270 is assumed to have a time constant equal to $T2$, then $$t/RC=T1\cdot T2.$$

In both instances these time constants correspond to the resistor and capacitor values. Accordingly, the desired exponential rate of correction is obtained by selecting the values for integrators 240 and 270.

In the illustrative embodiment, ($t$) corresponds to the time it takes the error $e_r(K_n)$ to decrease from a maximum value from ±0.5 to a zero error with $\gamma$ having a value of 0.1165. The interval $t$ is given by the nominal period of pulses within the data stream multiplied by the number of pulses (i.e., 200 nanoseconds·15).

It will be appreciated that it may become desirable to decrease the above time interval, for acquiring initial synchronization and maintain the same rate of correction. This can be accomplished by providing means for automatically increasing the number of input pulses initially applied to the read clock.

By way of illustration, the components selected for resonant tank circuit 280, integrators 240 and 270 and input resistance of emitter-follower 285 for achieving a critically damped correction rate within the predetermined number of pulses at the selected value for Q are listed in the table herein to follow.

TABLE

| | | | |
|---|---|---|---|
| inductor **282** | =7.6 microhenries | resistor **272** | =220 ohms |
| inductor **283** | =5.6 microhenries | Rin | =10 kilohms |
| varactor, VC | =77 picofarads | resistor **242** | =240 ohms |
| capacitor **274** | =1 microfarad | capacitor **242** | =.15 microfarads |

The above values are provided for purpose of illustration only and should not be construed in any way to limit the scope of the present invention.

In summary, the invention provides an improved read clock system which independently processes timing and data wavetrains as derived from a random access memory so as to enable easy adjustment of the output wavetrains so as to provide the desired phase relationship therebetween.

In practice, the invention can be used for changes from the illustrated embodiment. For example, other types of amplifiers, different values of Q, different polarities of voltage sources and transistors may be utilized.

While in accordance with the provisions and statutes there has been illustrated and described the best form of the invention known, certain changes may be made to the circuits described herein without departing from the spirit of the invention as set forth in the appended claims and that in some cases, certain features of the invention may be used to advantage without a corresponding use of other features.

Having described the invention, what is claimed as new and novel and for which it is desired to secure Letters Patent is:

1. A method for generating first and second pulse trains from an input data stream for facilitating the recovery of information from said input data stream consisting of data and sync pulses wherein the pulses of said data stream are subject predictable phase and frequency deviations, said method comprising the steps of:

1. generating from said pulses, a reference waveform including a plurality of reference points;
2. sampling the phase difference between said waveform and each of said pulses of said data stream at predetermined sets of said reference points for deriving an error signal proportional to the difference in phase therebetween;
3. adjusting the frequency of said reference waveform at a predetermined rate, in accordance with said error signal to establish a predetermined phase relationship therebetween;
4. deriving said first pulse train from predetermined ones of said reference points of said reference waveform;
5. generating a linear ramp waveform from each of said data and sync pulses; and,
6. deriving from said linear ramp waveform said pulses of said second train at predetermined intervals between the pulses of said first and second trains by sensing a selected threshold level of said linear ramp waveform.

2. A method for generating first and second pulse trains from an input data stream for facilitating the recovery of information from said input data stream consisting of data and sync pulses wherein the pulses of said data stream are subject predictable phase and frequency deviations, said method comprising the steps of:

1. shaping each of the pulses of said input data train;
2. generating directly from said shaped pulses, a symmetrical sinusoidal reference waveform including a plurality of zero crossover reference points;
3. sampling the phase difference between said sinusoidal waveform and each of said shaped pulses of said data stream at predetermined sets of said reference points for deriving an error signal proportional to the difference in phase therebetween;
4. adjusting at a predetermined rate, the frequency of said reference waveform in accordance with said error signal to establish a predetermined phase relationship therebetween;
5. deriving said first pulse train from predetermined ones of said zero crossover reference points of said sinusoidal waveform;
6. generating a ramp waveform from each of said data and sync pulses; and,
7. detecting a predetermined threshold level of said ramp waveform to derive said pulses of said second train, said threshold level being selected to maintain maximum separation between the pulses of said first and second trains.

3. A method for generating a pair reference waveforms for facilitating recovery of information from an input data stream having data and sync pulses encoded as the absence or presence of a pulse between regularly occurring sync pulses and wherein the sync pulses of said data stream are subject to predictable phase variations and slight frequency variations, said method comprising the steps of:

1. shaping each of the pulses of said input data train;
2. generating a periodic reference signal waveform from said shaped data stream pulses;
3. sampling the phase difference between said periodic reference waveform and each of the pulses within said data stream;
4. adjusting at an exponential rate, the phase of said reference waveform to establish the phase quadrature relationship between the pulses of said data stream and reference points of said periodic reference waveform;
5. deriving timing pulses from predetermined reference points along said periodic reference signal;
6. deriving a linear ramp signal with different characteristics from said periodic reference waveform from each of pulses of said data stream; and,
7. generating upon each occurrence of said last-mentioned signal, pulses corresponding to the number of pulses of said input data stream, wherein said pulses are generated when said ramp signal reaches a predetermined threshold.

4. An apparatus for deriving a timing train and a data train from an input data pulse stream consisting of data and sync pulses derived from signals recorded in random access memory using a double recording technique, said apparatus comprising:

1. normally inactive resonant means coupled to receive the pulse stream for generating a periodic reference signal including alternately occurring zero crossover reference points;
2. phase-sampling means coupled to receive the pulse stream and to said resonant means for sampling the phase difference between each of said pulses and said sets of reference points of said reference signal;
3. integrating means connected in series with said phase-sampling means and said resonant means, said integrating means responsive to said phase-sampling means to generate an error voltage proportional to said phase difference and for generating a correction bias voltage for adjusting at a predetermined rate the frequency of said resonant means to establish a predetermined phase relationship between the pulses of said data stream and said reference signal;
4. means for generating a ramp voltage waveform in response to each pulse of said data pulse stream;
5. variable threshold switching means connected to receive said ramp waveform and for generating pulses of said data train so as to be delayed in accordance with a selected threshold level of said voltage waveform; and,
6. detector means for deriving the pulses of said timing pulse train with a predetermined phase relationship to said data train from predetermined ones of said alternately occurring zero crossover reference points of said sinusoid reference signal.

5. The apparatus of claim 4 wherein said integrating means includes a first integrator connected in series with a second integrator to provide a time constant for producing a magnitude of correction voltage which adjusts said frequency of said resonant means to establish said phase relationship at a critically damped rate.

6. The apparatus of claim 4 wherein said pulse sampling means includes bridge network having first and second inputs connected respectively to receive said shaped pulses of said data stream and said sinusoidal reference signal; and amplifier means being connected in series with said phase-sampling means and said integrating means, said amplifier means connected to apply to said integrating means in the absence of an error voltage, a reference voltage of a predetermined magnitude and polarity for conditioning said resonant tank circuit means to generate said sinusoidal signal at a nominal frequency.

7. The apparatus of claim 4 wherein said resonant means consists of a parallel resonant tank circuit whose nominal resonant frequency corresponds to the frequency of said pulses of said data stream, said parallel resonant tank circuit including a voltage variable capacitor means, said capacitor means connected to receive said correction bias voltage for changing its capacitance and adjusting the frequency of said resonant circuit at said critically damped rate.

8. Apparatus of claim 7 wherein said parallel resonant means includes resistive, capacitive and inductive elements having predetermined values, said values of said elements selected to provide a predetermined value of Q for decreasing the amplitude of said sinusoidal reference signal upon the absence of a successive predetermined number of pulses in said data stream to a magnitude sufficient to inhibit said detector from switching to provide pulses of said timing train from said predetermined ones of said crossover reference points.

9. Read clock apparatus for use in a magnetic memory system for facilitating detection of information contained in a data stream derived from double frequency recorded binary signals which include a sync bit at the beginning of each interval and a data bit substantially in the mid point of each interval wherein such sync bits are subject to both frequency and phase shift, said read clock apparatus comprising:

filter means connected to shape said binary signals of said data stream;

normally inactive oscillatory means coupled to said filter means for generating a symmetrical periodic reference signal including a number of reference points in response to said shaped pulses;

phase-sampling and correcting means coupled to said normally inactive oscillatory means for producing an error signal whose magnitude is proportional to the phase displacement between said shaped pulses of said data stream relative to predetermined ones of said reference points, said phase-sampling and correction means connected to apply an error signal voltage to said oscillatory means to adjust its frequency at a predetermined exponential rate;

means for generating a ramp signal in response to each pulse of said data stream, variable threshold detector means coupled to said ramp generating means being operative at a predetermined threshold level to generate pulses of a data output waveform, and;

crossover detector means for deriving an output timing wavetrain from predetermined alternate points of said periodic reference signal.

10. A read clock apparatus for generating a timing wavetrain and a data wavetrain for facilitating the recovery of information of an encoded input data stream derived from double frequency recorded binary signals received from a random address memory wherein said data stream is preceded by a predetermined number of pulses for synchronizing said read clock apparatus with said data stream, said read clock apparatus comprising:

a filter for shaping each of the pulses of said data stream into a Gaussianlike waveform;

a normally inactive resonant tank circuit including a voltage frequency sensitive element, said resonant tank circuit being coupled to said filter and being operative in response to said shaped to generate a periodic sinusoidal reference signal having a plurality of crossover points;

a phase sampler connected to receive said shaped waveform and said periodic reference signal, said phase sampler being operative to sample the phase difference between each shaped waveform and crossover points of said reference signal;

integrator means connected in series with said phase sampler, said integrator means connected to generate an error correction voltage for application to said voltage frequency sensitive element for varying the frequency of said resonant tank circuit at a predetermined rate for minimizing the number of synchronizing pulses required to synchronize said read clock apparatus;

impedance matching means connected to said resonant tank circuit and to said phase sampler, the input impedance of said impedance-matching means in combination with the frequency elements of said resonant tank circuit selected to provide a predetermined circuit Q;

a crossover detector coupled to said impedance-matching means, said detector being operative to generate pulses of said timing wavetrain from predetermined crossover points of said sinusoidal reference signal;

a ramp generator connected to receive pulses of said data stream for generating a ramp output waveform for each pulse of said data stream; and, variable threshold switching means connected to said ramp generator, said threshold switching means being operative to derive pulses of said data wavetrain from a predetermined threshold level of each of said ramp waveforms selected to provide a maximum separation between pulses of said timing and data wavetrain.

11. The read clock apparatus of claim 10 wherein said phase sampler includes a bridge network having first and second inputs and an output, said first input connected to receive said shaped pulses from said filter and said second input connected to receive said sinusoidal reference signal, said bridge network being conditioned to sample the difference in phase between said sinusoid and shaped pulse only when activated by said shaped pulse.

12. The read clock apparatus of claim 10 wherein said integrator means includes first and second integrator circuits, each having an input and output, said input of said first integrator being connected to said phase sampler for receiving the output thereof and said output being connected to said second integrator input, said second integrator output being connected to apply said correction voltage to said voltage frequency element.

13. The read clock apparatus of claim 12 wherein said first and second integrator circuits have predetermined time constants, said time constants being selected so that their product produces an error correction voltage which varies at a critically damped rate.

14. The read clock apparatus according to claim 10 wherein said filter includes a series connected inductor and capacitor having a predetermined time constant for shaping said pulses into said Gaussianlike waveform.

15. The read clock apparatus of claim 10 wherein said ramp generator includes a pair of complementary transistors, a first transistor being connected in a common collector configuration, said first transistor having an input circuit for receiving said data stream pulses and an output circuit for generating said ramp waveform; said second transistor being connected in a common emitter configuration and including an input circuit and output circuit, said input circuit being connected in series with said first the emitter-collector path of said first transistor and said output circuit being connected to the input circuit of said first transistor wherein said first transistor is switched off by each pulse of said data stream for a period of time determined by said output circuit in turn switching off said second transistor.

16. The read clock apparatus of claim 15 wherein said output circuit of said first transistor includes a resistor and capacitor network having values selected for a predetermined time constant and said first and second transistors respectively are PNP- and NPN-conductivity-type semiconductors.

17. The read clock apparatus according to claim 10 wherein said variable threshold switching means includes current-switching means in series with complementary transistor output means, said current-switching means having first and second input circuits and at least an output circuit, said first circuit connected to receive said ramp output from said ramp generator, said second input circuit being connected to a variable voltage source for establishing said predetermined threshold switching level of said current-switching means is operative when said wherein said current-switching means ramp outputs provide a voltage level equal to said switching level to produce signals on said output for conditioning said transistor output means to generate said pulses of said data wavetrain.

18. The read clock apparatus of claim 17 wherein said complementary transistor output means includes a pair complementary transistors, a first transistor including an input circuit and an output circuit and being connected in a common base configuration and said second transistor including an input circuit and an output circuit and being connected in a common collector configuration, said input circuit being connected in series with said first transistor output circuit, and said input circuit of said first transistor when conditioned by each signal on said detector output to render said first transistor conductive, said input circuit of said second transistor being conditioned by the output circuit of said conductive first transistor to switch said second transistor into conduction thereby producing said pulses of said data wavetrain.

19. In a random access memory system in which data derived therefrom is encoded as a series of data and sync pulses comprising:

a read clock apparatus including a phase loop having a normally inactive resonant tank circuit for generating a sinusoidal reference signal in response to sync and data pulses received from said memory system, means coupled to said tank circuit for deriving pulses of a timing train, said apparatus including a data processing portion connected to receive said sync and data pulses and for deriving therefrom pulses of a data train, said processing portion including a ramp generating means coupled to a variable threshold means for adjusting the pulses of said data train to have a predetermined phase relationship to said pulses of said timing train, and recovery logic means connected to receive said timing and data trains from said read clock apparatus, said recovery logic means including logic means for combining said timing and data trains to separate the data signals of said data train from the sync signals.

20. The random access memory system according to claim 19 wherein said recovery logic means includes a data register logic and data separator logic, said data register logic including first logic means for combining said timing and data trains so as to separate the pulses of said data train into first and second streams containing binary ONES and binary ZEROS respectively and said data separator logic including second logic means coupled to said first logic means and being conditioned thereby to separate said first and second streams into data and sync pulses.

21. The system of claim 20 wherein said first logic means includes:

a logic gate DIT connected to receive said data and timing trains and conditioned to sample the state of said data train;

a flip-flop OIC coupled to said logic gate DIT for storing the data content of a previous interval of time in accordance with the state of logic gate, DIT;

pulse-generating means connected to receive pulses of said during train and being conditioned thereby to generate a pulse of a predetermined pulse width; and, logic gating means being coupled to said flip-flop OIC and to said pulse-generating means so as to generate said first and second streams containing binary ONES and binary ZEROS respectively for application to said second logic means.

22. The memory system of claim 21 wherein said second logic mean includes a flip-flop, DS, connected to said flip-flop OIC and logic gating means, said flip-flop, DS, being conditioned thereby to switch to one of its state in the presence of a data pulse and to another one of its states in the presence of a sync pulse, and said logic means further including a pair of data and sync gates connected to said flip-flop, DS, and to said logic gating means, each of said pair of gates being arranged to provide separate ZERO and ONE outputs for said data and sync pulses corresponding respectively to DATA "0," DATA "1," and SYNC "0," SYNC "1."

* * * * *